United States Patent [19]

Onishi

[11] Patent Number: 5,408,063
[45] Date of Patent: Apr. 18, 1995

[54] FLUID FLUSHING DEVICE
[75] Inventor: Yoshinori Onishi, Ishikawa, Japan
[73] Assignee: Sodick Co., Ltd., Yokohama, Japan
[21] Appl. No.: 140,466
[22] Filed: Oct. 25, 1993
[30] Foreign Application Priority Data
  Oct. 26, 1992 [JP] Japan .................. 4-311168
[51] Int. Cl.6 .............................. B23H 7/36
[52] U.S. Cl. ................ 219/69.14; 204/224 M; 219/69.11
[58] Field of Search ........... 219/69.11, 69.14; 198/345.3; 204/224 M, 129.55, 129.6, 129.65; 408/56, 61, 67; 409/135, 136, 137, 219-227; 29/33 P

[56] References Cited

U.S. PATENT DOCUMENTS

| | | | |
|---|---|---|---|
| 2,680,994 | 6/1954 | Wood | 409/225 |
| 4,201,284 | 5/1980 | Brems | 198/345.3 |
| 4,688,321 | 8/1987 | Smith | 409/225 |
| 4,850,099 | 7/1989 | Scollard | 408/56 |
| 5,004,530 | 4/1991 | Tanaka | 204/224 M |
| 5,318,396 | 6/1994 | Babel et al. | 409/137 |

FOREIGN PATENT DOCUMENTS

| | | | |
|---|---|---|---|
| 308908 | 3/1989 | European Pat. Off. | 29/33 P |
| 55-137839 | 10/1980 | Japan . | |
| 56-114627 | 9/1981 | Japan | 219/69.17 |
| 56-163829 | 12/1981 | Japan | 204/224 M |
| 60-99522 | 6/1985 | Japan | 219/69.11 |
| 60-146631 | 9/1985 | Japan . | |
| 62-16266 | 4/1987 | Japan . | |
| 63-91339 | 6/1988 | Japan . | |
| 2-97538 | 8/1990 | Japan . | |
| 2-198719 | 8/1990 | Japan | 219/69.17 |
| 2-232137 | 9/1990 | Japan . | |
| 4-275829 | 10/1992 | Japan | 219/69.17 |

Primary Examiner—Geoffrey S. Evans
Attorney, Agent, or Firm—Marks & Murase

[57] ABSTRACT

A fluid flushing device for an electroerosion apparatus for flushing a machining gap (32) with a dielectric fluid comprising a coupling block (46) having a supply conduit (19;45) connected to a supply source of dielectric fluid at one end. A pallet (1) for carrying the workpiece (14) includes a passage (17,28;41), and is equipped with a flexible hose (30) having a presetable flushing direction or orientation. The other end of the passage couples with the supply conduit when the automatic pallet changer (80) loads the workpiece on the apparatus through the pallet, so that continuous automatic operation can be realized.

7 Claims, 5 Drawing Sheets 5,408,063

FLUID FLUSHING DEVICE

FIELD OF THE INVENTION

The present invention relates generally to an electric discharge machining ("EDM") apparatus for machining a workpiece contained in a work tank in which the workpiece may be loaded into the apparatus using a pallet. More specifically, the present invention relates to a fluid flushing device for an electric discharge machining apparatus for cleaning a machining gap formed between a tool electrode and the workpiece by means of flushing or suctioning of dielectric fluid.

BACKGROUND OF THE INVENTION

In electric discharge machining apparatus, automatic pallet changers may be used for loading and unloading a workpiece.

FIG. 7 illustrates a conventional electric discharge machining apparatus and an automatic pallet changer 80. The basic components of the electric discharge machining apparatus comprise a machine body 70 and a power generator 60 for supplying voltage pulses. The machine body 70 includes a bed 71 on which a cross table (not illustrated) is provided. A work tank 56 is overlaid on the cross table and is movable in a horizontal plane defined by orthogonally disposed X and Y axes. In the work tank 56, a positioning jig 3 and a leveling pin 4 are fixed on a work table (not illustrated). The machine body 70 further includes a column 72 which, in the illustrated embodiment, is provided rearwardly of the bed 71. A head part 74 is supported on the column 72. A tool electrode 31 is attached to the head part 74 by means of a tool holder 75. In the head part 74, a motor is provided for moving the tool electrode 31 in a Z axis direction which is orthogonal to the horizontal plane formed by the X and Y axes.

The pallet changer 80 includes a post 81 which can be raised and lowered. A turntable 82 is supported on the post 81. An arm driver 83 is provided on the turntable 82 for extending and retracting an arm 84.

When preparing to machine, the pallet changer 80 places a pallet 1, on which a workpiece 14 is clamped (by means of clamps), on the arm 83. The arm 83 is positioned to oppose the work tank 56 by rotating the turntable 82. The pallet 1 may be precisely placed on the positioning jig 3 in the work tank 56 by extending, lowering and then retracting the arm 83. Then, as shown in FIG. 6, after raising the side walls 26 of the work tank 56, the work tank 56 is filled with dielectric fluid 55.

During the EDM process, electric discharges are induced in a machining gap 32 formed between the tool electrode 31 and the workpiece 14 by applying voltage pulses thereacross. The dielectric fluid 55 in the machining gap 32 is heated by the discharge current, thereby producing dissociated gases. Accordingly, there is a need for cleaning and cooling the machining gap 32, such as by flushing or suctioning the dielectric fluid through holes provided in the workpiece 14 and/or the tool electrode 31, to prevent the machined particles and the gases from accumulating in the machining gap 32.

Further, a flushing attachment 57 may be provided on the work table 2, using, for example, a magnetic clamp 59, as shown in FIG. 6. The flushing attachment 57 includes a piping block 27 having a passage 58 therein. A flexible hose 30, which may be bent into a desired orientation and is preferably equipped with a nozzle 29, extends upwardly from the piping block 27. If necessary, a plurality of passage 58 may be provided in the piping block 27 so that a plurality of flexible hoses 30 can be used. The passage 58 is connected to a dielectric fluid supply tank through a pipe 21 and a coupler 24 attached to the work table 2.

However, in the arrangement shown in FIG. 6, it is necessary to retract the flexible hose or hoses 30 when loading or unloading the workpiece 14. In addition, manual bending of the flexible hose or hoses 30 into a desired form is again required after the pallet 1 is placed on the positioning jig 3. Thus, even though automation in the EDM process may be realized by a NC unit, it is still not possible to perform completely unmanned loading of the workpiece.

SUMMARY OF THE INVENTION

An object of the present invention is to provide a fluid flushing device for electric discharge machining in which the workpiece is automatically loaded without retracting the fluid flushing device.

It is another object of the invention to provide a fluid flushing device for electric discharge machining in which it is not necessary to adjust the flushing direction of the fluid flushing device after the workpiece has been automatically loaded.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

A general aspect of the present invention is the provision of a fluid flushing device in an EDM apparatus for cleaning a machining gap formed between a tool electrode and a workpiece by selectively flushing or suctioning a dielectric fluid. The device comprises workpiece carrying means, such as a pallet having a third branch passage formed therein, for carrying the workpiece to load it on the EDM apparatus, a positioning jig for receiving the pallet, and a coupling block having a supply conduit connected to a source of supply of dielectric fluid at its one end and means for coupling the other end of the supply conduit with one end of the fluid branch passage formed in the pallet when the positioning jig receives the pallet.

In accordance with a preferred embodiment of the present invention, the pallet has a hole or depression which is in fluid communication with the fluid branch passage.

Preferably, at least one flexible hose may be connected to other end of the fluid branch passage formed in the pallet for flushing the machining gap with dielectric fluid.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Figure 1:
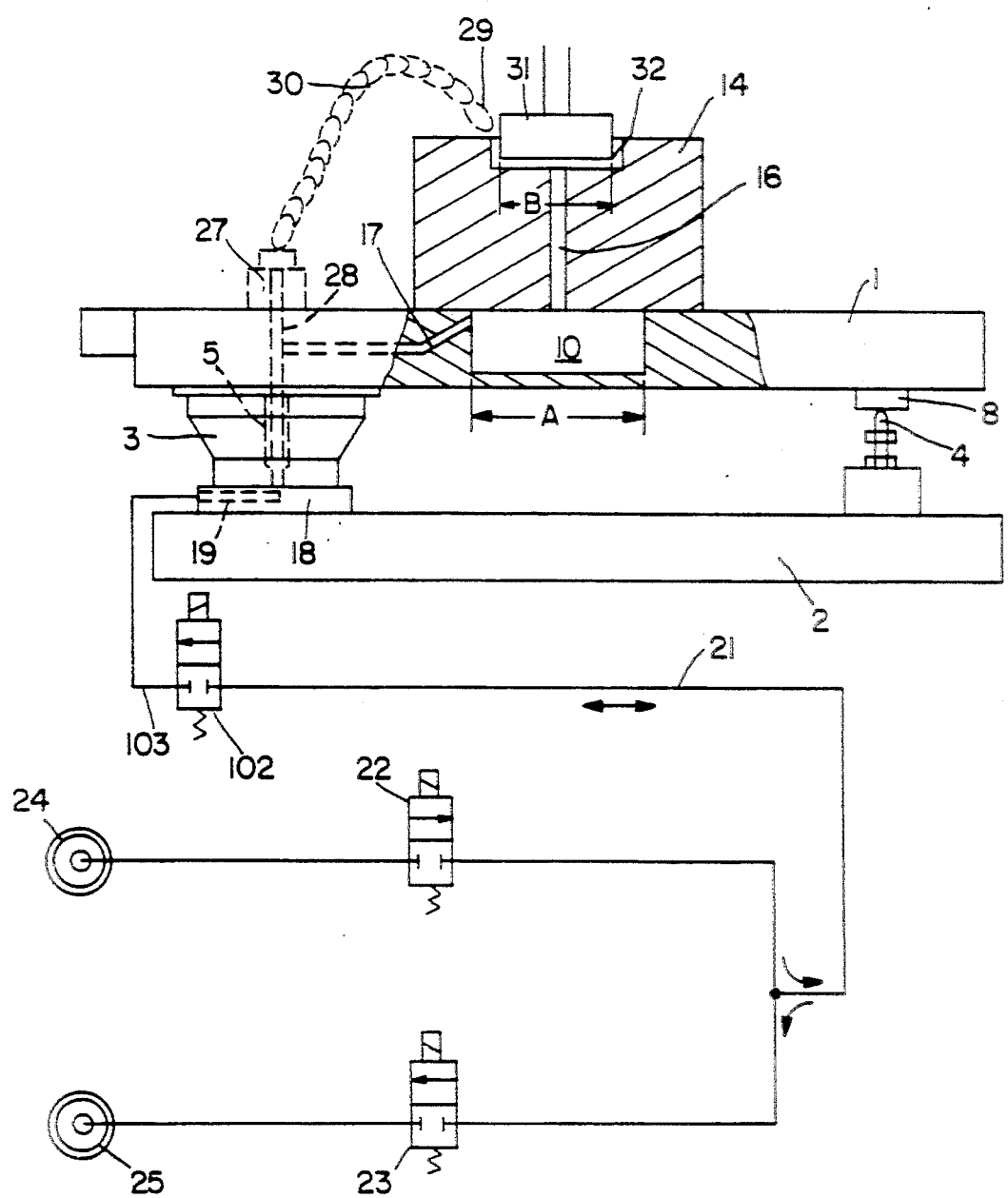
FIG. 1 is a schematic side view in partial section of a fluid flushing device in accordance with a first embodiment of the present invention.
Figure 5:
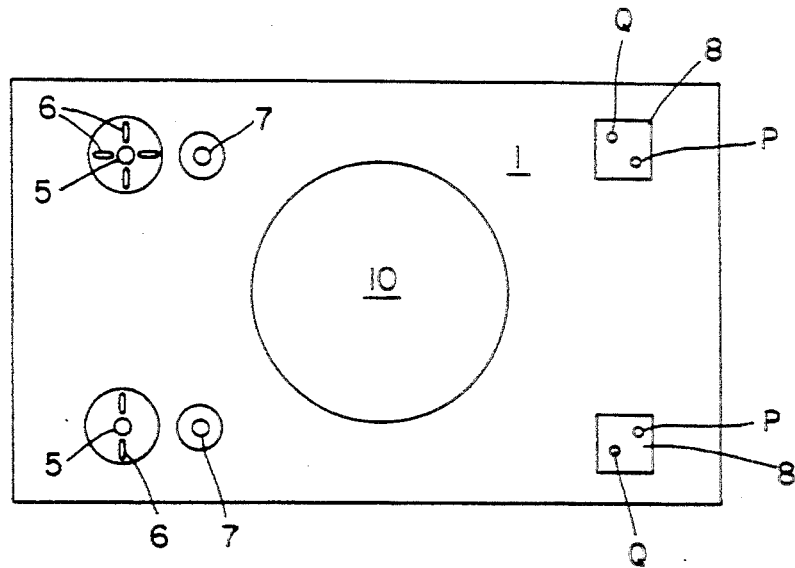
FIG. 5 is a bottom view of a pallet as used in the embodiments of FIGS. 1-4.

Reference will now be made to FIG. 1 and FIG. 5 to explain the fluid flushing device in accordance with the first embodiment of the present invention. A pallet 1 is positioned, usually parallel to and above a table 2, by means of a positioning jig 3 and a leveling pin 4 secured on the table 2. As best shown in FIG. 5, the pallet 1 may be supported by two pieces for each positioning jig 3 and by the leveling pins 4 at four points. The pallet 1 has a generally plate-like structure and is usually provided with holes, grooves and clamps for clamping a workpiece. A hollow lever 5 which protrudes downwardly from the bottom of the pallet 1 is guided onto the positioning jig 3 using clamp balls actuated by springs by means of a wedging action so that engaging parts 6 around the hollow lever 5 engage the positioning jig 3. There is no need to describe the positioning jig 3 in detail, as it has a well-known construction.

In the illustrated embodiment (as best seen in FIG. 5), guide holes 7 are provided on the underside of the pallet 1 adjacent to the lever(s) 5. These guide holes 7 serve as positioning holes when the pallet 1 is standing by on a pallet stocker (not illustrated). The guide holes 7 are inserted into guide pins of the pallet stocker to roughly position the pallet 1. Further, backing plates 8 are attached on the underside of pallet 1. The backing plates 8 come in contact with the leveling pins 4 at the touching positions (P) when the pallet 1 is supported in the work tank 56. The backing plates 8 come in contact with supporting parts of the pallet stocker at the positions (Q) when the pallet 1 is in the stand-by mode.

In addition, in the illustrated embodiment, a generally cylindrical hole or depression 10 is formed in the middle of the pallet 1. In the illustrated embodiment, the diameter (A) of the depression 10 is larger than the diameter (B) of the tool electrode 31 so that the tool electrode 31 can penetrate the workpiece 14.

Figure 6:
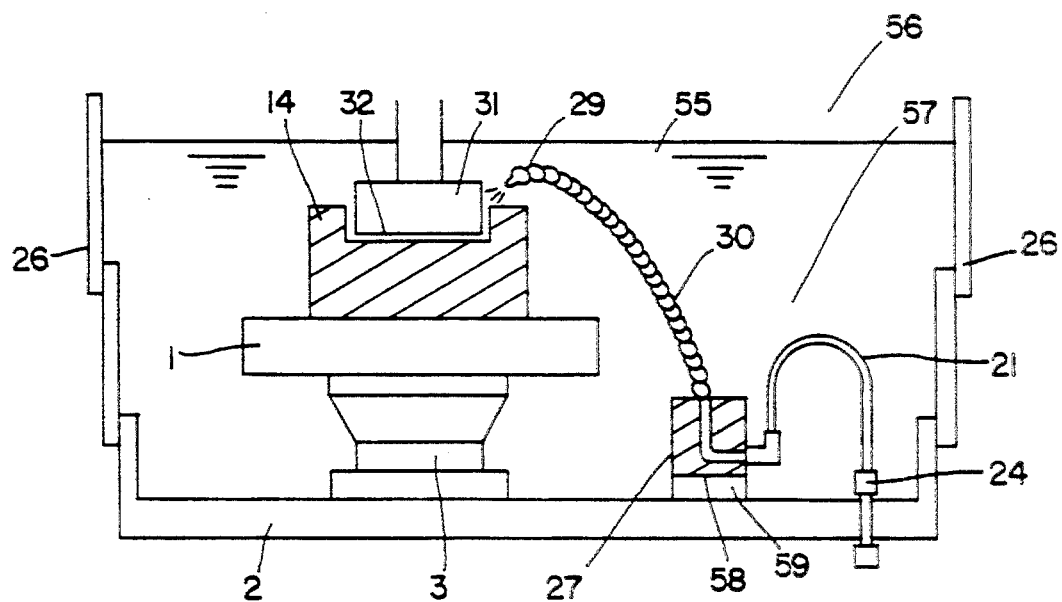
FIG. 6 is a schematic side view in partial section of a fluid flushing device according to the prior art.
Figure 7:
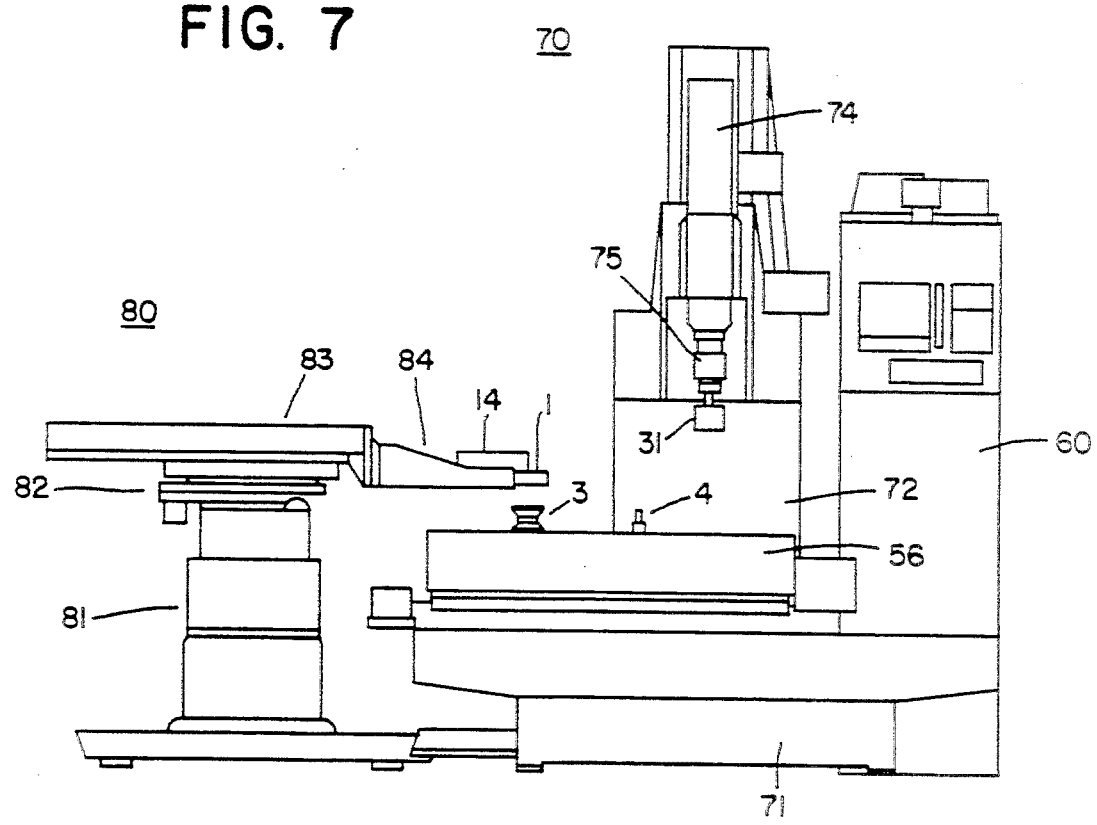
FIG. 7 is a front view of a typical electric discharge machine and an automatic pallet changer with which the present invention may be used.

A fluid passage 16 is formed in the workpiece 14, the passage 16 communicating with the machining gap 32. The workpiece 14 is secured on the pallet 1 so that the fluid passage 16 opens to the depression 10. A branch passage 17 is formed in the pallet 1 so as to connect the depression 10 to the passage in the hollow lever 5. The branch passage 17 preferably opens into the depression 10 near the underside of the workpiece 14 so that any dissociated gases which may have accumulated in the upper part of the depression 10 can be flushed away or drawn off to reduce the possibility that electric discharges will ignite the gases as the machining process progresses. A supply conduit 19 is formed in a base member 18 of the positioning jig 3 in the fluid communication with the passage in the hollow lever 5. A pipe 21 is provided to connect the supply conduit 19 to a flushing coupler 24 and a suction coupler 25 through solenoid valves 22 and 23, respectively. The flushing and suction couplers 24 and 25, respectively, are attached on the work table 2 as shown in FIG. 6, or to the periphery of the work tank 56.

In preparing to machine with a suctioning operation, the solenoid valve 23 is open after positioning the pallet 1 on the positioning jig 3. The tool electrode 31 is advanced toward the workpiece 14 to perform the electric discharge machining while the dielectric fluid in the machining gap 32 is suctioned through the fluid passage 16, the depression 10, the branch passage 17, the passage in the hollow lever 5 which is in the positioning jig 3, the supply conduit 19, the pipe 21 and the coupler 25 to thereby remove any machined particles and/or dissociated gases. When the machining process is completed, the dielectric fluid is discharged from the work tank 56. After lowering the side walls of the work tank 56 and raising the tool electrode 31 away from the workpiece 14, the pallet changer unloads the workpiece 14 and loads a new workpiece on the EDM apparatus.

In preparing to machine using a flushing operation, the solenoid valve 22 is open after filling the depression 10 with the dielectric fluid by applying suction to it for a predetermined time. During the machining process, dielectric fluid from the dielectric fluid supply tank is supplied to the machining gap 32 through the coupler 24. In this case, it is not essential for the branch passage 17 to open at the upper part of the depression 10 since dissociated gases are not likely to accumulate therein.

In addition, as shown in FIG. 1 in dashed lines, it is also possible to provide a piping block 27 on the pallet 1 and to provide a fluid branch passage 28 branching off from the branch passage 17. Then, a flexible hose 30 equipped with the nozzle 29 may be disposed on the piping block 27 to supply dielectric fluid to a desired part of the machining gap 32. The flushing direction of the flexible hose 30 is preset when the workpiece 14 is placed on the pallet 1. A plurality of flexible hoses 30 may be fed from a single piping block 27.

Figure 2:
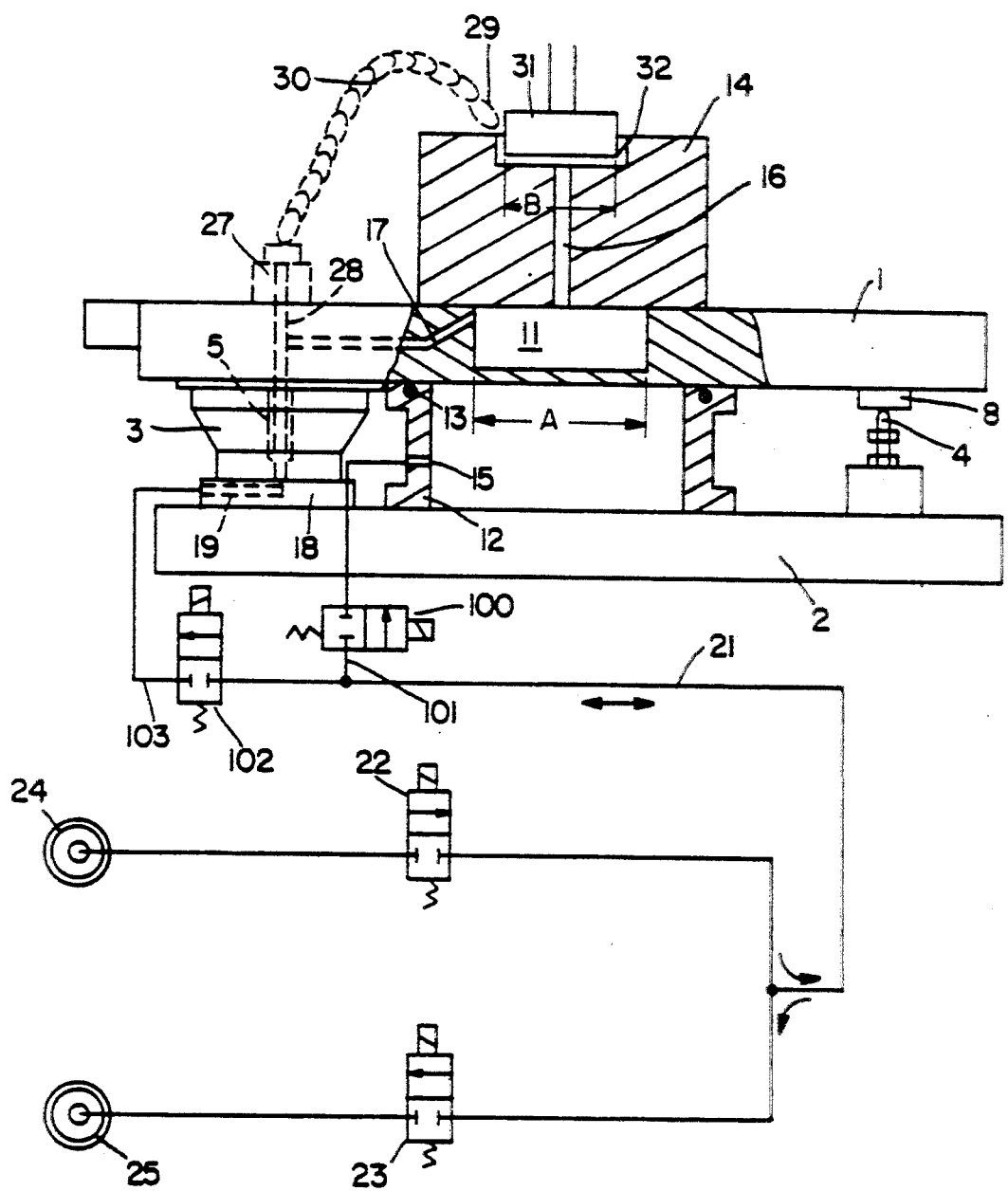
FIG. 2 is a schematic side view in partial section of a fluid flushing device in accordance with a second embodiment of the present invention.

FIG. 2 illustrates the fluid flushing device in accordance with the second embodiment of the present invention. In this embodiment, the pallet 1 has a through hole 11 so that the invention may be adapted for use with a wire-cut electroerosion apparatus by feeding a wire electrode through the workpiece and through hole 11. In addition, a tubular member 12 is preferably fixed on the work table 2 under the through hole 11. Preferably, the tubular member 12 has sufficient height to contact the underside of the pallet 1 by means of a seal 13 when the pallet 1 is supported on the positioning jig(s) 3 and the leveling pin(s) 4. However, the seal 13 is not critical, since the pallet 1 and the tubular member 12 are both submerged under the dielectric fluid. An opening 15 is formed at one end of the tubular member 12. A solenoid valve 100 is provided in a piping line 101 coupled to the opening 15, and a solenoid valve 102 is provided in a piping line 103 coupled to the positioning jig 3, respectively.

When machining using suction in the working gap, the solenoid valves 23 and 102 are opened while the solenoid valve 100 is closed. Then, the tool electrode 31 is advanced toward the workpiece 14 to perform the electric discharge machining while the dielectric fluid in the machining gap 32 is suctioned through the fluid passage 16, the through hole 11, the branch passage 17, the passage of the hollow lever 5 in the positioning jig 3, the supply conduit 19, the pipe 21, and the coupler 25 to thereby remove any machined particles and/or dissociated gases. When the machining process is completed, the dielectric fluid is discharged from the work tank. The remaining fluid in the tubular member 12 may also be discharged by suctioning it through the opening 15 with the solenoid valve 102 closed and the solenoid valve 100 open. After lowering the side walls of the work tank 56 and raising the tool electrode 31 away from the workpiece 14, the pallet changer may unload the workpiece 14 and load a new workpiece on the EDM apparatus.

When machining using a flushing operation, the solenoid valve 22 is opened after filling the through hole 11 and the tubular member 12 with dielectric fluid by suctioning fluid into the tubular member from the work tank for a predetermined time. During the machining process, the dielectric fluid from the dielectric fluid supply tank is supplied to the machining gap 32 through the coupler 25. The rest of the operation is the same as above, except that in this case it is not essential to form an exit of the branch passage 17 in the upper part of the through hole 11. Further, it is also possible to provide the piping block 27 on the pallet 1 and to provide one or more fluid passages 28 from the branch passage 17 to which a hose(s) 30 may be coupled.

Figure 3:
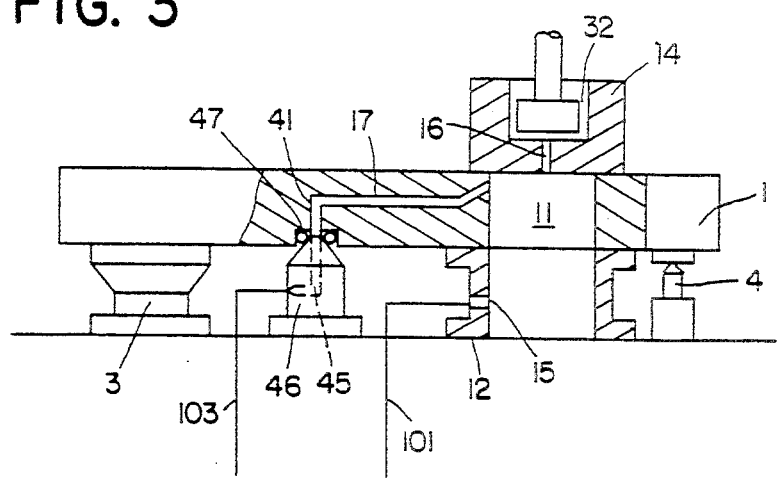
FIG. 3 is a schematic side view in partial section of a fluid flushing device in accordance with a third embodiment of the present invention.

FIG. 3 illustrates a fluid flushing device in accordance with a third embodiment of the present invention. In this embodiment, a catch port 41 is formed on the underside of the pallet 1. A coupling block 46, having a supply conduit 45 therein, is fixed on the work table 2. One end of the supply conduit 45 is connected to the piping line 103, while the other end opens at the top of the coupling block 46 and couples with the catch port 41 through a seal 47 when the pallet 1 is positioned on the positioning jig(s) 3 and the leveling pin(s) 4. The dielectric fluid can be supplied to the machining gap 32 through the piping line 103, the supply conduit 45, the branch passage 17, the through hole 11, and the hole 16 in the workpiece 14. Therefore, the supply conduit 19 formed in the base member 18, as shown in FIGS. 1 and 2 is not needed.

Figure 4:
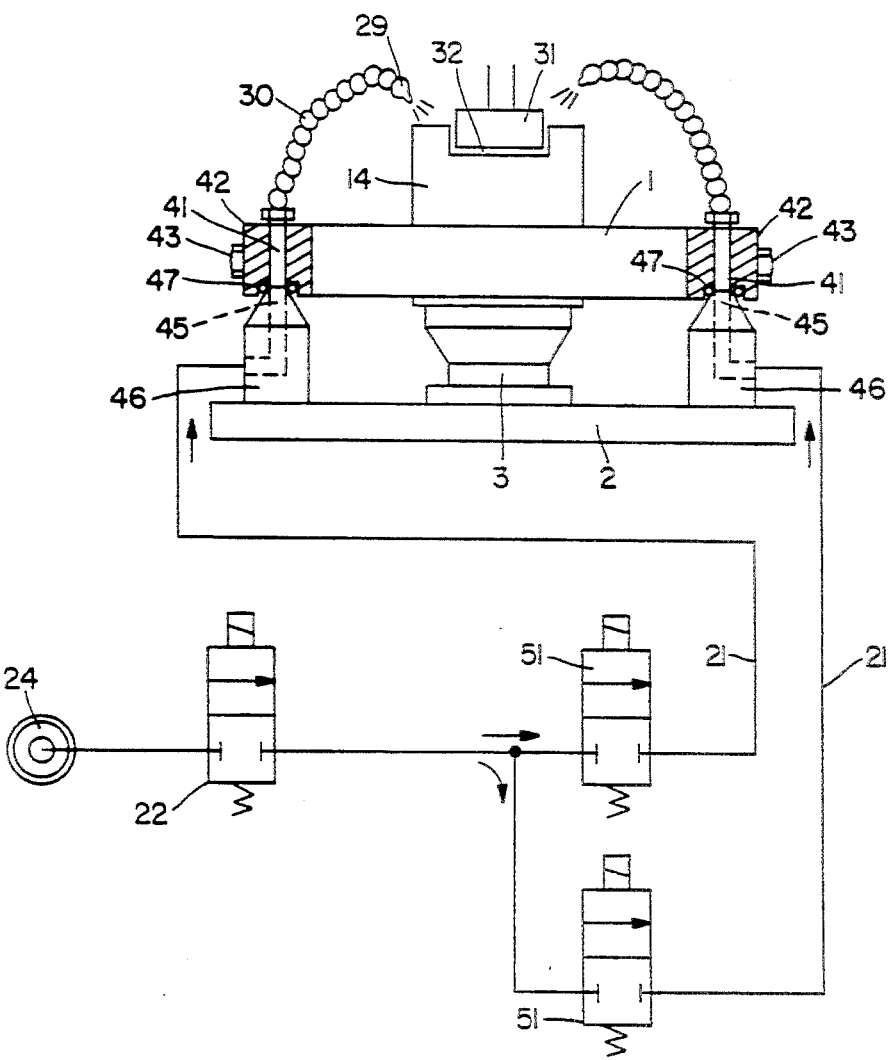
FIG. 4 is a schematic side view in partial section of a fluid flushing device in accordance with a fourth embodiment of the present invention.

FIG. 4 illustrates a fluid flushing device in accordance with a fourth embodiment of the present invention. In this embodiment, a plurality of catch ports 41 are provided along sides of the pallet 1 to couple with respective supply conduits 45, formed in the coupling block 46, when the pallet 1 is positioned on the positioning jig(s) 3 and the leveling pin(s) 4. The catch ports 41 extend upwardly, and preferably each is provided with a flexible hose 30, equipped with a nozzle 29. Alternatively, the catch ports 41 may be formed as part of a joint attachment 42, which can be attached to the pallet 1 by means of a bolt 43, for example. The coupling blocks 46 for the catch ports 41 are connected to the flushing coupler 24 through the pipes 21 and solenoid valves 51. During the machining process, dielectric fluid may be supplied to the machining gap 32 from the desired nozzle or nozzles 29 by controlling the solenoid valves 51. In accordance with this embodiment, it is possible to successively machine a plurality of the workpieces supported on the single pallet 1 by selectively turning the solenoid valves 51 on and off.

The foregoing description of preferred embodiments of the invention have been presented for purposes of illustration and description. It is not intended to be exhaustive or to limit the invention to the precise form disclosed, and obviously many modifications and variations are possible in light of the above teaching. For example, though only two flexible hoses 30 are illustrated in FIG. 4, any desired number of flexible hoses may be provided. It is intended that the scope of the invention be defined by the claims appended hereto.

I claim:

1. A fluid flushing device for an electroerosion apparatus for cleaning a machining gap formed between a tool electrode and a workpiece by selectively flushing or suctioning a dielectric fluid in said gap comprising:
   a workpiece carrying means for loading said workpiece in said apparatus, said workpiece carrying means having a first conduit;
   a receiving means for receiving said workpiece carrying means; and
   a coupling means having a second conduit adapted to be connected at one end thereof to a dielectric fluid supply source, and a means for coupling said second conduit with said first conduit when said receiving means receives said workpiece carrying means.

2. A fluid flushing device of claim 1, wherein said workpiece carrying means defines an open space, said open space being in fluid communication with said first conduit.

3. A fluid flushing device of claim 1, wherein said first conduit includes a branch conduit and further comprising at least one flexible tubular member connected to an end of said branch conduit for flushing the machining gap with said dielectric fluid.

4. A fluid flushing device for cleaning a machining gap formed between a tool electrode and a workpiece in an electroerosion machine by selectively flushing or suctioning a dielectric fluid in said machining gap comprising:
   a work tank for containing the workpiece;
   a workpiece carrying means for loading said workpiece in said apparatus, said workpiece carrying means having therein a first conduit; and
   a receiving means for receiving said workpiece carrying means, said receiving means having therein a second conduit connected at one end to a source of dielectric fluid and adapted to be connected to said first conduit when said receiving means receives said workpiece carrying means whereby said first conduit communicates with said source of dielectric fluid when said receiving means receives said workpiece carrying means.

5. The fluid flushing device according to claim 2, wherein said open space comprises a depression formed in said workpiece carrying means over which said workpiece is adapted to be positioned.

6. The fluid flushing device according to claim 2, wherein said open space comprises a through hole formed in said workpiece carrying means over which said workpiece is adapted to be positioned.

7. The fluid flushing device according to claim 6, wherein said electroerosion apparatus includes a worktable further comprising a member for generally defining a volume between said worktable and an underside of said workpiece carrying means, said member having an opening therein adapted to be selectively connected to said source of dielectric fluid for flushing said working gap or to a source of suction for suctioning said working gap.

* * * * *